US012578964B2

(12) United States Patent
Bouzguarrou et al.

(10) Patent No.: US 12,578,964 B2
(45) Date of Patent: Mar. 17, 2026

(54) PREDICTION DATA CORRUPTION

(71) Applicant: ARM Limited, Cambridge (GB)

(72) Inventors: Houdhaifa Bouzguarrou, Austin, TX (US); Michael Brian Schinzler, Round Rock, TX (US)

(73) Assignee: Arm Limited, Cambridge (GB)

( * ) Notice: Subject to any disclaimer, the term of this patent is extended or adjusted under 35 U.S.C. 154(b) by 208 days.

(21) Appl. No.: 18/459,602

(22) Filed: Sep. 1, 2023

(65) Prior Publication Data

US 2025/0077233 A1      Mar. 6, 2025

(51) Int. Cl.
G06F 9/38          (2018.01)

(52) U.S. Cl.
CPC .......... G06F 9/3806 (2013.01); G06F 9/3844 (2013.01)

(58) Field of Classification Search
CPC .............................. G06F 9/3806; G06F 9/3844
See application file for complete search history.

(56) References Cited

U.S. PATENT DOCUMENTS

| | | | | |
|---|---|---|---|---|
| 2007/0162728 A1* | 7/2007 | Yokoi | ................... | G06F 9/3848 |
| | | | | 712/240 |
| 2008/0114971 A1* | 5/2008 | Fontenot | .............. | G06F 9/3863 |
| | | | | 712/E9.035 |
| 2017/0344377 A1* | 11/2017 | Levitan | ................. | G06F 1/3287 |
| 2018/0203702 A1* | 7/2018 | Yu | .......................... | G06F 9/3836 |
| 2020/0285476 A1* | 9/2020 | Bolbenes | ........... | G06F 9/38585 |

OTHER PUBLICATIONS

Lu, Z., Lach, J., Stan, M.R. et al. Alloyed Branch History: Combining Global and Local Branch History for Robust Performance. International Journal of Parallel Programming 31, 137-177 (2003). https://doi.org/10.1023/A:1022669325321 (Year: 2003).*

* cited by examiner

*Primary Examiner* — Jyoti Mehta
(74) *Attorney, Agent, or Firm* — NIXON & VANDERHYE P.C.

(57) ABSTRACT
A data processing apparatus is provided. It includes history storage circuitry that stores historic data of instructions and prediction circuitry that predicts a historic datum of a specific instruction based on subsets of the historic data of the instructions. The history storage circuitry overwrites the historic data of one of the instructions to form a corrupted historic datum and at least one of the subsets of the historic data of the instructions includes the corrupted historic datum.

18 Claims, 7 Drawing Sheets

| Entries | 80 |
|---|---|
| Bits | 4 |
| | |
| Param | Value |
| Used branches | 60 |
| Inflight branches | 80 |
| MAX corrupt | 0 |
| LHR per set | 560 |
| LHR total | 4480 |
| | |
| Param | Value |
| Used branches | 60 |
| Inflight branches | 60 |
| MAX corrupt | 20 |
| LHR per set | 480 |
| LHR total | 3840 |
| | |
| Param | Value |
| Used branches | 60 |
| Inflight branches | 50 |
| MAX corrupt | 30 |
| LHR per set | 440 |
| LHR total | 3520 |
| | |
| Param | Value |
| Used branches | 60 |
| Inflight branches | 40 |
| MAX corrupt | 40 |
| LHR per set | 400 |
| LHR total | 3200 |

FIG. 4a

| | T1 | T2 | T3 | T4 | T5 | T6 | T7 | T8 |
|---|---|---|---|---|---|---|---|---|
| Hist length | 12 | 20 | 40 | 60 | 80 | 120 | 160 | 200 |
| Branches | 3 | 5 | 10 | 15 | 20 | 30 | 40 | 50 |
| Corrupt range | 47 | 45 | 40 | 35 | 30 | 20 | 10 | 0 |

FIG. 4b

PREDICTION DATA CORRUPTION

TECHNICAL FIELD

The present disclosure relates to data processing and particularly predictions associated with data processing of instructions.

DESCRIPTION

History based predictors can be used to predict the behaviour of an instruction given the behaviour of instances of other previous instructions. However, there are limits to the amount of history that can be stored—particularly if the number of in-flight instructions (those that have been predicted but have not yet been completed/committed) is large. When these limits are reached, it is sometimes necessary to stall the pipeline to allow instructions to complete/commit. This can be undesirable because it limits the speed at which instructions can be processed.

SUMMARY

Viewed from a first example configuration, there is provided a data processing apparatus comprising: history storage circuitry configured to store historic data of instructions; and prediction circuitry configured to predict a historic datum of a specific instruction based on a plurality of subsets of the historic data of the instructions, wherein the history storage circuitry is configured to overwrite the historic data of one of the instructions to form a corrupted instruction datum; and at least one of the subsets of the historic data of the instructions includes the corrupted historic datum.

Viewed from a second example configuration, there is provided a data processing method comprising: storing historic data of instructions; and predicting a historic datum of a specific instruction based on a plurality of subsets of the historic data of the instructions, wherein the historic data of one of the instructions is overwritten to form a corrupted instruction datum; and at least one of the subsets of the historic data of the instructions includes the corrupted historic datum.

Viewed from a third example configuration, there is provided a non-transitory computer-readable medium to store computer-readable code for fabrication of a data processing apparatus comprising: history storage circuitry configured to store historic data of instructions; and prediction circuitry configured to predict a historic datum of a specific instruction based on a plurality of subsets of the historic data of the instructions, wherein the history storage circuitry is configured to overwrite the historic data of one of the instructions to form a corrupted instruction datum; and at least one of the subsets of the historic data of the instructions includes the corrupted historic datum.

BRIEF DESCRIPTION OF THE DRAWINGS

The present invention will be described further, by way of example only, with reference to embodiments thereof as illustrated in the accompanying drawings, in which:

FIG. 2 comprises FIGS. 2a, 2b, and 2c.

FIG. 3 comprises FIGS. 3a, 3b, and 3c.

FIG. 4 comprises FIGS. 4a and 4b. FIG. 4a shows parameters for TAGE predictors and a level of corruption that can be permitted. FIG. 4b shows how varying levels of corruption cause the enablement/disablement of particular tables;

DESCRIPTION OF EXAMPLE EMBODIMENTS

Figure 1:
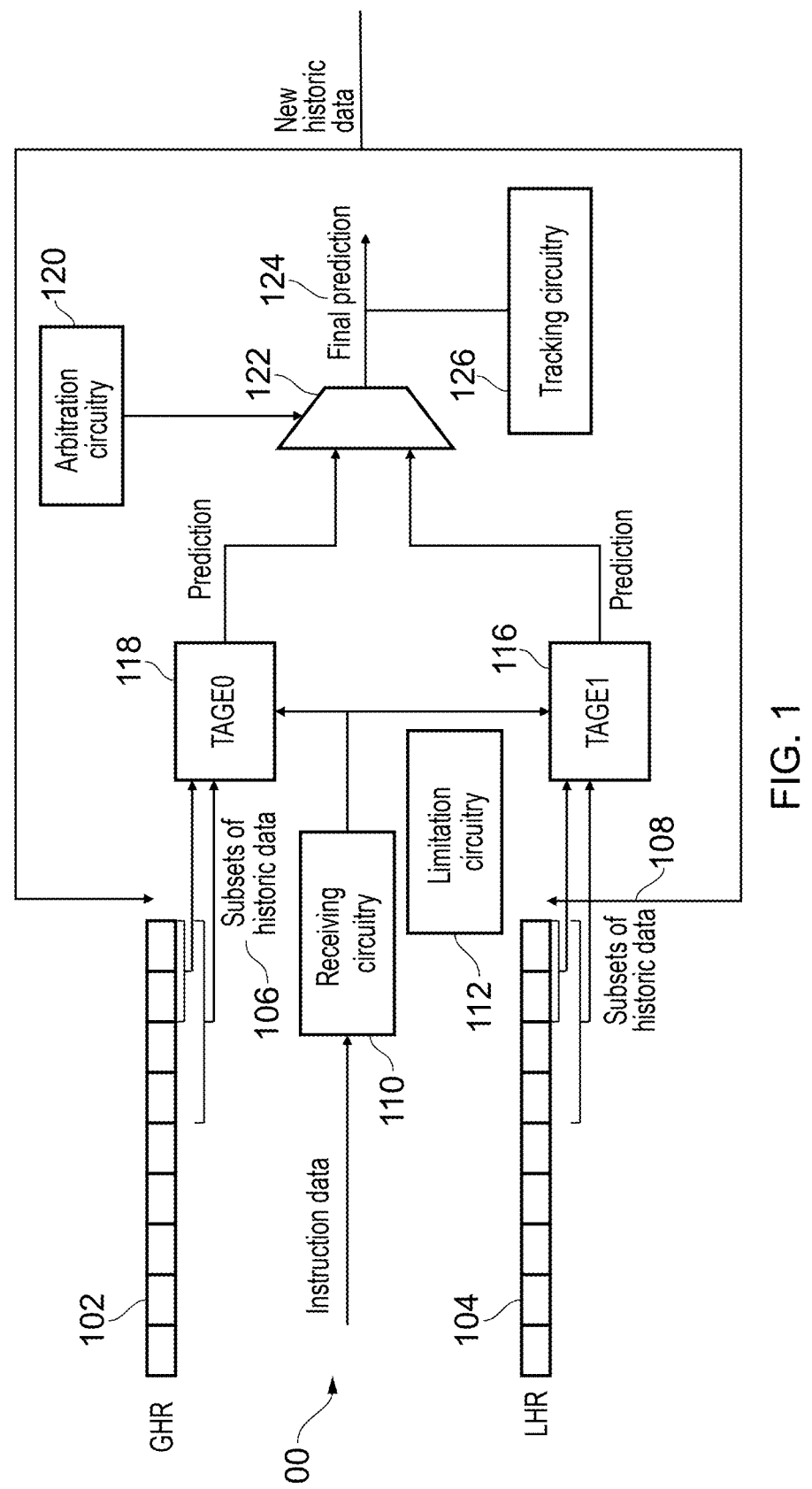
FIG. 1 schematically illustrates the present technique in accordance with some examples.

Before discussing the embodiments with reference to the accompanying figures, the following description of embodiments is provided.

In accordance with one example configuration there is provided a data processing apparatus comprising: history storage circuitry configured to store historic data of instructions; and prediction circuitry configured to predict a historic datum of a specific instruction based on a plurality of subsets of the historic data of the instructions, wherein the history storage circuitry is configured to overwrite the historic data of one of the instructions to form a corrupted instruction datum; and at least one of the subsets of the historic data of the instructions includes the corrupted historic datum The historic data of instructions could be some information about the execution of the instruction such as its program counter value, outcome, information regarding the past execution path leading to the current instruction, or even some specific information about the instruction's outcome. In any event, the historic data of instructions are stored within the history storage circuitry (which might take the form of a global history register for instance) and subsets of the historic data are fed into the prediction circuitry to produce a prediction for a different instruction-one whose outcome is to be predicted and therefore whose data is not within the subset of historic data fed in to the prediction circuitry. Some of the instructions are in-flight. That is to say that the historic data has not yet been finalised either because the historic data has only been predicted or because the historic data has been calculated but cannot be finalised until previous instructions (in program order) have had their historic data finalised. By keeping track of historic data for instructions that are in-flight it is possible to rewind the history storage circuitry—either if the prediction is incorrect or if the prediction of an earlier instruction is incorrect (thereby necessitating a different control flow path to have been taken). Previously, if the amount of historic data stored for in-flight instructions grows too large (e.g. such that a capacity of the history storage circuitry is met) then the system stalls until the oldest in-flight instructions can be committed. However, in the present example, at least one historic datum of an instruction that is in-flight is overwritten (e.g. with a new historic datum of a new instruction). The old instruction's historic datum is therefore corrupted rather than requiring a stall to take place, which improves the overall instruction rate of the apparatus. As will be discussed in more detail below, the effect of this corruption can be carefully controlled. The history storage circuitry could take the form of a global history register or a local history register, for instance. Such overwriting could be avoided by providing larger storage. However, clearly this would increase the size of the circuitry as well as the power consumption, which is generally undesirable.

In some examples, the history storage circuitry is configured to store control flow information of control flow instructions as the historic data of the instructions; the specific instruction is a specific control flow instruction; and the one of the instructions is one of the control flow instructions. In these examples, the prediction is made in relation to control flow information relating to control flow instructions, which are instructions that cause the flow of a program to deviate from a usual sequential process. For instance, the prediction may be whether a given branch instruction (which is a type of control flow instruction) will be taken or not taken, and this prediction may be based on the control flow information, which might take the form of whether previous instructions were taken or not taken or might take the form of addresses to which previous branch instructions jumped (if they were taken).

In some examples, at least one of the subsets of the historic data of the instructions lacks the corrupted historic datum. That is there is at least one prediction that can be made by the prediction circuitry that would use the datum that has become corrupted. There is of course no obligation to actually generate such a prediction using the corrupted data. In these examples, it is simply the case that a prediction would normally have been made using data that is now corrupt.

In some examples, one or more items of the historic data are predicted historic data from those of the instructions that are in-flight. The prediction circuitry is therefore able to make predictions using those subsets of the historic data that do not include the corrupted datum. Thus, even in the presence of the corruption, predictions can still be made.

In some examples, the prediction circuitry is configured to suppress or limit predictions produced using one of the subsets of the historic data of the instructions that includes the corrupted outcome. Such predictions are therefore not actually produced in order to avoid the use of worthless predictions generated using the corrupted datum.

In some examples, the prediction circuitry is configured to use a different plurality of subsets of the historic data to produce predictions for different instructions; and the corrupted outcome is corrupted in respect of older instructions in the instructions and is uncorrupted in respect of new instructions in the instructions. Since the corrupted datum represents old data that has been overwritten with new data, the corrupted is subjective. That is, to old instructions that would have made use of the old data, the datum has become corrupted. In contrast, to new instructions, the datum makes use of the new data and so is therefore not corrupted.

In some examples, the corrupted historic datum is an oldest historic datum of the historic data. Corruption therefore occurs in respect of outcomes that have been stored for longer and are less likely to be in-flight (i.e. are uncommitted). By replacing an oldest datum, it is anticipated that this will have less of a knock-on effect to other (particularly newer) entries since the corrupted datum will be further away from newer entries and therefore less likely to be used. In addition, it will also be appreciated that, particularly in the case of control flow instructions, as one goes forward in time through unresolved control flow instructions, the likelihood that a rewind will be necessary increases. This is because the prediction of any control flow instruction is dependent not only on the prediction for that instruction, but also any control flow instruction that was necessary to get to that point. Phrased differently, if the prediction for a previous control flow instruction was incorrect then the current instruction might not be executed or might be executed via a different execution path. By corrupting the oldest data then, it is less likely that the corruption will affect entries that are likely to be used for predictions of newer instructions—even if a rewind occurs.

In some examples, the history storage circuitry is configured to overwrite a plurality of the historic data of the instructions to form a plurality of corrupted historic data including the corrupted historic datum. In these examples, more than one entry of the history storage circuitry is corrupted.

In some examples, the corrupted historic data are oldest historic data of the historic data. As explained above, it can be preferable to corrupt an oldest entry of the historic data. Therefore for multiple corruptions it can be useful to corrupt the oldest entries.

In some examples, the data processing apparatus comprises: limitation circuitry configured to cause execution of further instructions to stall in response to a number of the corrupted historic data meeting a predetermined limit. As a consequence of the history storage circuitry overwriting (and corrupting) old entries rather than stalling to wait for the oldest entries to resolve, there may come a point where the level of corruption (and the associated costs) become so great that it is desirable to disallow the corruption and instead permit the stall to occur. There are a number of ways of determining this allowed corruption level, which are discussed below. However, in these examples, the limitation circuitry serves to limit the corruption up to a predetermined limit.

In some examples, the predetermined limit is changeable at runtime. For instance, the predetermined limit may not be hard coded into hardware or only settable when the system powers up but can instead be changed. The changes might be limited to being performed by supervisory software such as an operating system or hypervisor. In other embodiments, the changes might be performed only be the hardware in an autonomous manner.

In some examples, the data processing apparatus comprises: further prediction circuitry different from the prediction circuitry and configured to predict the historic datum of the specific instruction in a manner different to the prediction circuitry; arbitration circuitry configured to arbitrate between the prediction circuitry and the further prediction circuitry to produce a final prediction; and tracking circuitry configured to track a number of times that the final prediction is generated from the prediction circuitry, wherein the predetermined limit is based on the number of times that the final prediction is generated from the prediction circuitry. In these examples, the prediction circuitry is used alongside further prediction circuitry. This may take the form of both prediction circuits being used simultaneously, or one of the two prediction circuits being used depending on the expectation of which will perform better. In any event, arbitration circuitry is used to resolve this and determine how to produce a final prediction. The tracking circuitry is used to determine, over a period, how often the final prediction is generating using specifically the prediction circuitry (as opposed to the further prediction circuitry). This could take the form of a count or a ratio for instance and indicates how useful the prediction circuitry is to forming predictions at any particular time. The predetermined limit is based on the number of times that the final prediction is generated from the prediction circuitry. Thus, the amount of corruption that is permitted in data used by the prediction circuitry to make predictions is dependent on the extent to which the prediction circuitry is required.

In some examples, as the number of times that the final prediction is generated from the prediction circuitry increases, the predetermined limit decreases. The extent to which corruption is allowed decreases as the need for the prediction circuitry (as compared to the further prediction circuitry) increases. That is to say that increased reliance on the prediction circuitry causes means that less corruption is permitted so that the prediction circuitry can be used to a greater extent.

In some examples, the data processing apparatus comprises: a plurality of history storage circuits, including the history storage circuitry, wherein each of the history storage circuits is configured to store historic data of different subsets of the instructions; and each of the history storage circuits has its own predetermined limit. By providing a set of history storage circuits, it is possible to perform filtering on the items used to perform predictions. This in turn makes it possible to remove 'prediction polluters' from the prediction process. A common example of this comes up in control flow prediction where the history of other branch instructions (for instance) may be a good indicator of the behaviour of a future branch instruction. In these examples, one might look at the recent history of branch predictions. However, if a previous branch instruction behaves randomly (for instance, if it is repeated a variable number of times) then the branch history itself moves around and it becomes very difficult to establish a common pattern of behaviour over time. By excluding certain instructions (e.g. by having the history of contiguous blocks of instructions stored in dedicated storage circuits) there is a possibility that corruption sources can be confined or excluded. In these examples, the extent to which corruption is allowed can be determined on a case-by-case basis for each history storage circuit. For instance, if one history storage circuit is relied upon a great deal then its tolerance for corruption might be far lower than a history storage circuit whose stored outcomes are almost never used for predictions.

In some examples, the subsets are of different sizes; and the subsets used to predict the historic datum of the specific instruction comprise a contiguous series of the historic data starting from a most recent of the historic data in program order. The prediction circuitry may use different numbers of historic data to produce one or more predictions that are coalesced into the predicted outcome. The subsets of historic data start from a most recent outcome that is stored in the history storage and a number of contiguous outcomes from that point are used. Where multiple history storage circuits are used, as described earlier, the process remains the same but the historic data that will have been stored will be different, with not every instruction having an associated outcome that is stored.

In some examples, the prediction circuitry comprises a TAGE predictor that stores a plurality of tables; and each of the subsets of the historic data of the instructions is used to index into a different table of the TAGE predictor; at least one table is disabled in response to the corrupted historic datum being formed. A TAGE predictor contains a number of tables, with each table taking as an input a number of previous items of historic data. The table taking the largest input that hits (and therefore takes the most historic data into account) is the one that is used to produce the prediction of the prediction circuitry.

In some examples, a corruption counter to count a number of the historic data that are corrupted; and the at least one table is enabled and disabled based on a value of the corruption counter.

In some examples, the history storage circuitry is implemented as a circular buffer. For example, the history storage circuitry may take the form of a register implemented as a circular buffer. In a circular buffer, the end of the storage is adjacent to the start of the storage. Consequently, increasing the index when it is at the end of the storage circuitry causes the index to return to 0. A pointer can be used to point to the start or end of the buffer, depending on the buffer's function.

Particular embodiments will now be described with reference to the figures.

FIG. 1 illustrates an apparatus 100 in accordance with some examples. These examples maintain a global history register (GHR) 102, in which historic data relating to previous control flow instructions is stored. Examples of such historical data will be illustrated with respect to later figures, however this can include the outcomes of the previous control flow instructions, or addresses associated with those instructions such as the program counter value of the instruction or the program counter value to which the instruction branches (if it is taken). The historical data could also be a combination of these factors (or others) and in any event might be hashed. For the sake of simplicity, these examples will assume that each item of historic data is simply whether a control flow instruction was taken (T) or not taken (N). Each item of historic data therefore relates to the execution of one previous instance of a control flow instruction.

In these examples, when a prediction is to be made for an instruction received at the receiving circuitry 110, subsets of the historic data 106 are taken from the GHR 102 and provided to a TAGE predictor (TAGE0) 118 together with information regarding the received instruction.

One or more local history registers (LHR) 104, are provided. In this example, a single local history register (LHR) 104 is present. Similarly to the GHR 102, the LHR 104 maintains historic data relating to instructions. In practice, the LHR 104 may only store historic data corresponding to some of the instructions whose historic data is stored in the GHR 102. However, similarly to the GHR 102, subsets of the historic data 108 are provided to a TAGE predictor (TAGE1) 116 together with information regarding the current instruction. For instance, instructions who fall within a first 4 GB of address space may have their history stored in a first LHR, instructions who fall within a second 4 GB of address space may have their history stored in a second LHR and so on.

It will be appreciated that in these examples, the subsets of historic data 106, 108 provided to the TAGE predictors 116, 118 are contiguous. That is to say that each subset takes historic data consecutively from within the GHR 102 and LHR 104. Each of the subsets taken from the GHR 102 is different and each of the subsets taken from the LHR 104 is different. Each subset of historic data is used to look up a different TAGE table, with each table giving a predicted outcome. The TAGE table that provides a hit using the largest amount of history data is used to produce the prediction for that TAGE predictor. Note that in some embodiments, the subsets might not contain contiguous items of historic data.

The predictions produced by the TAGE0 118 and TAGE1 116 predictors are provided to a multiplexer 122, which is controlled by arbitration circuitry 120. The arbitration circuitry 120 is used to choose between the predictions produced by each of the TAGE predictors 116, 118 in order to produce a final prediction 124. Tracking circuitry 126 is provided in order to track which of the TAGE predictors 116, 118 was used to produce the final prediction 124.

As instructions are executed, new historic data is produced. In some examples, this could be the final prediction 124 itself whereas in other examples the historic data could take the form of the address to which the branch instruction. In any case, the historic data might start out (and be stored in the GHR 102 and LHR 104) as a prediction that is updated in response to a misprediction. That is to say that not only can a prediction be made for each instruction, but the historic data associated with each instruction might also be used for the predictions of later instructions.

Clearly both the GHR 102 and the LHR 104 have a limited capacity. Both registers may be cleared over time as predicted in-flight instructions are resolved (i.e. no longer predicted but finally calculated and committed). Under normal circumstances, if no capacity exists in one of the history registers, then at least part of the pipeline might be stalled until capacity exists. The determination of whether capacity exists and whether prediction stalling should occur is controlled by limitation circuitry 112.

The present technique alleviates this stalling behaviour.

The examples described herein refer primarily to control flow prediction. However, the same techniques are equally applicable to data prediction as well. In addition although the examples being described have used TAGE predictors for the prediction, the present technique is applicable to other forms of prediction where some kind of historical information is kept.

In practice, final predictions that are produced using one of the LHRs as opposed to one of the GHRs are rare. That is to say that most of the time, the prediction that is generated using the GHR are correct and the LHR predictions are used primarily to avoid 'pollution' of historic data (e.g. where a branch instruction is unstable and/or executes a variable number of times, it may end up polluting the history so that it is difficult to draw conclusions about future instruction execution).

In this example, TAGE1 116 is an example of the claimed prediction circuitry and TAGE0 is an example of the claimed optional further prediction circuitry. The LHR is an example of the claimed history storage circuitry.

Figures 2A, 2B, 2C:
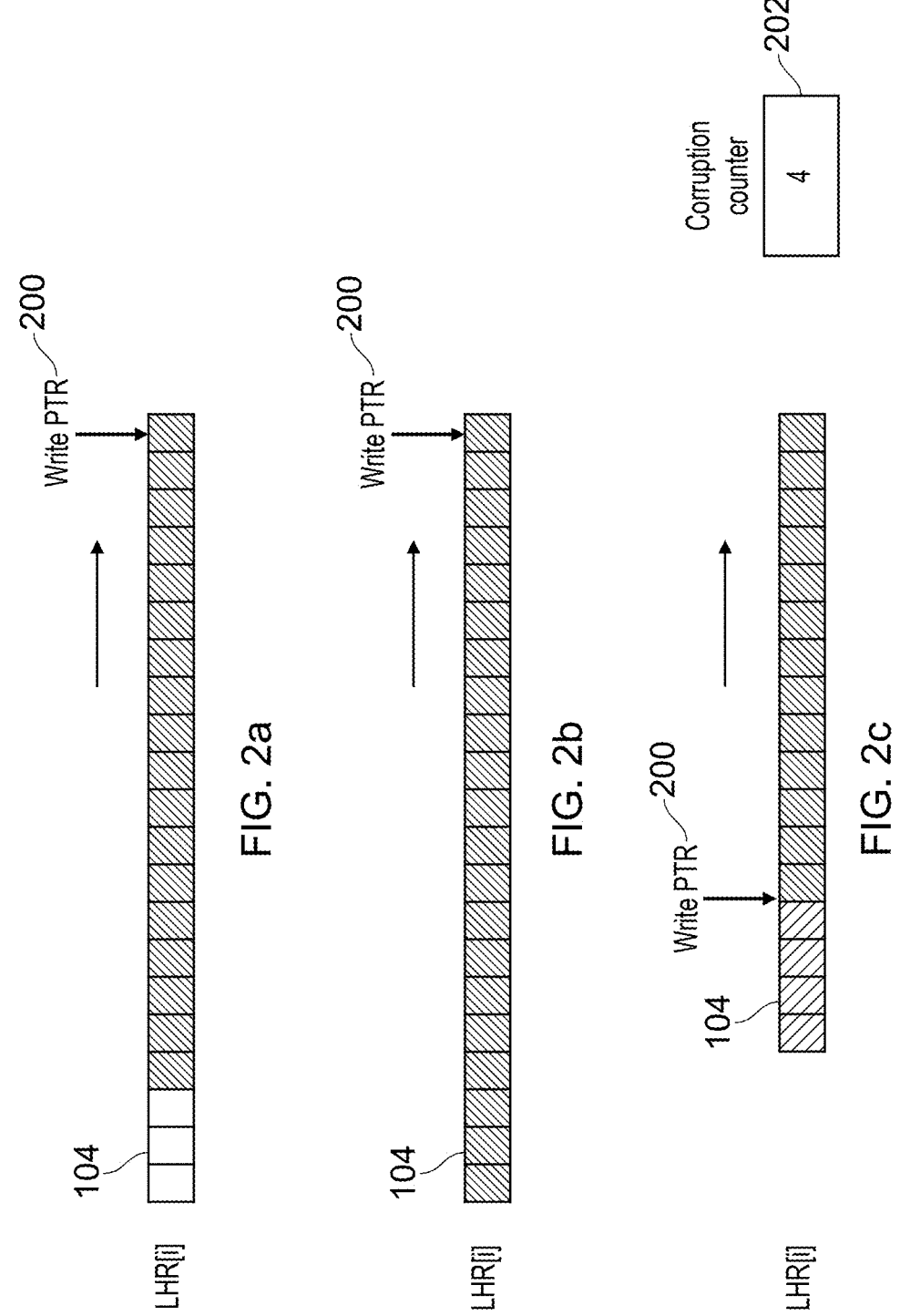
FIG. 2a shows an example of an LHR with some spare capacity.
FIG. 2b shows an example of an LHR with no spare capacity that can cause a stall.
FIG. 2c shows how corruption of older entries can prevent a stall from occurring.

FIG. 2, made up of FIGS. 2a, 2b, and 2c, illustrates the stalling situation in more detail. Each of FIGS. 2a, 2b, 2c shows the LHR 104 containing a number of historic entries. In these examples, each of the LHRs 104 is implemented as a circular buffer meaning that when the final position of the register is written to, a next entry will be written to at a first position. A write pointer 200 shows the position that the most recent entry has been written to. The arrows show the directionality of the circular buffer (left to right). For the avoidance of doubt, the occupied spaces can be tracked using a second pointer, as it typical with circular buffers.

FIG. 2a shows the contents of the LHR 104. The LHR 104 in FIG. 2a contains space for 21 entries and three of these are empty. Of the 18 used entries, some will be in-flight meaning that they have not yet resolved. A prediction may have been made for these instructions (e.g. as to whether a branch instruction will be taken or not), but the actual calculation has either not yet been met or not yet been finalised. These are instructions that have therefore been provisionally executed and could yet change—causing a 'rewind' to occur. When new historic data is to be inserted (e.g. due to the prediction of a next instruction taking place), it is stored in one of the free locations.

This situation works until the LHR 104 becomes completely occupied as illustrated in FIG. 2b. In this situation there are no free spaces to store further historic data. The system therefore stalls until such time as the next entry can be deleted, which occurs when the entry is no longer required for the prediction of other instructions. This is undesirable because it causes the instruction rate to drop. The stall will last until entries from the LHR 104 can be cleared. This occurs when instructions are completed (committed) and stop being in-flight. Since the uncertainty of those instructions is removed, there may be no need to keep as much data, and entries from the LHR can be removed.

FIG. 2c illustrates the present technique. In this example, the overall capacity of the LHR 104 has been reduced by four entries. Under the process illustrated in FIG. 2b, this would mean that a stall would have occurred before the first of these four instructions were executed. Instead, the present technique enables the new historic data to continue to be written to the LHR. This causes the old entries that were in that location to become corrupted since it is now overwritten with data relating to newer entries. In theory by corrupting specifically the oldest entries, the risk of important data being required is limited. Furthermore, this can inhibit a stall from taking place or outright prevent it altogether, since it is less necessary to wait for instruction resolution to take place to free up spaces in the LHR 104.

A corruption counter 202 is provided to keep a count of the number of entries in each LHR that are corrupted.

The extent to which such corruption is permitted may be limited, as will be shown in FIG. 3.

Figure 3A:
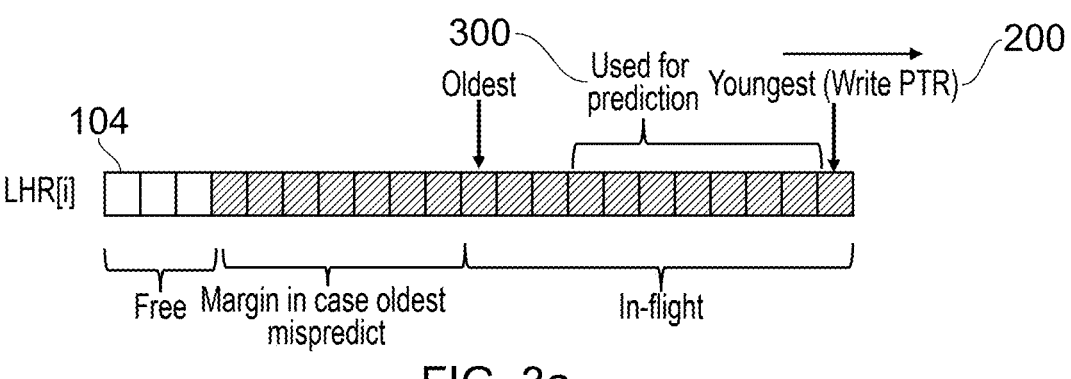
FIG. 3a shows an example of an LHR with some spare capacity
Figure 3B:
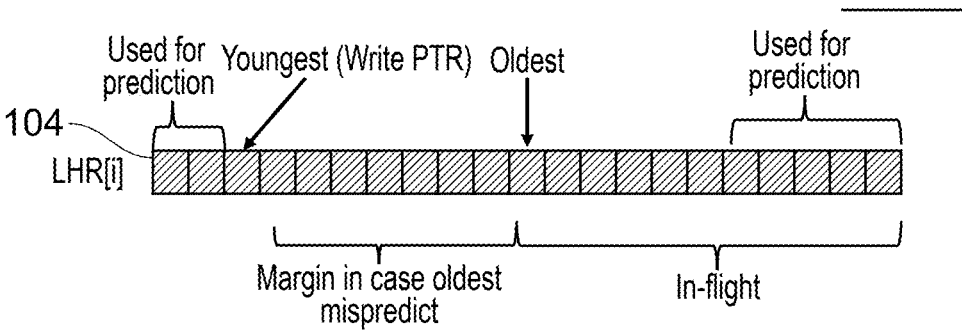
FIG. 3b shows an example of an LHR with no spare capacity that can cause a stall.
Figure 3C:
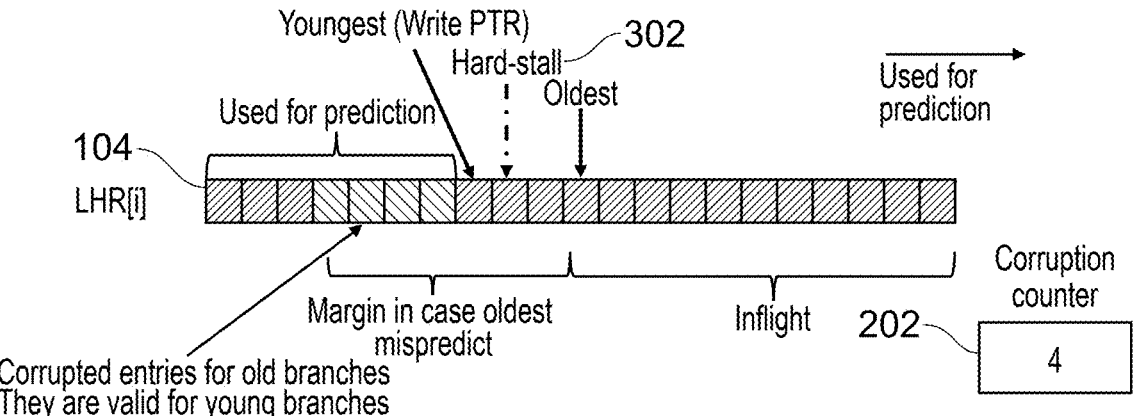
FIG. 3c shows how corruption of older entries can prevent a stall from occurring.

FIG. 3, which comprises FIGS. 3a, 3b, and 3c shows the corruption process in more detail. FIG. 3a shows the situation of FIG. 2a in more detail. Once again, a pointer 200 is used to point to a most recent entry of the LHR 104. A number of immediately preceding entries 300 are used to form a number of subsets of historic data that is used for predicting that most recent instruction. In general this pattern continues for all in-flight instructions (i.e. all instructions for which the final execution has not yet been committed/completed). A rewind could occur for any of these instructions, since none of these instructions yet has its final outcome confirmed. LHR 104 therefore continues to store historic data used for the prediction of an oldest in-flight instruction. After this data is stored, there remain three unused entries. Consequently, when historic data for a next instruction is to be stored, it can be written to one of these unused entries.

FIG. 3b shows the situation in which the LHR 104 is full when the present technique is unused. Without the present technique, this causes a stall. This is because there is no space left to store the historic data of a new instruction. Furthermore, if it is necessary to rewind to the oldest in-flight instruction then the oldest (leftmost) entries of the LHR 104 are necessary to re-perform the prediction (or to correct data stored in the prediction circuitry). A stall therefore occurs in order to prevent the overwriting of data. Once the oldest in-flight instruction is resolved, at least one of the margin entries can be cleared. In practice, any margin entry that is not used for the prediction of any other remaining in-flight instruction can be removed.

FIG. 3c illustrates the behaviour of the present technique. In this example, the oldest entries (those coming before the write pointer) are corrupted. That is, the old entries that were used as a margin in case of a misprediction for the oldest in-flight instruction have been overwritten with new historic data for most recently encountered instructions. As previously explained, this delays the need to stall the pipeline.

By causing the corruption of an oldest entry of the LHR 104, it is possible to confine the corruption to an area that it is least likely to be problematic. First of all, the oldest in-flight instruction is least likely to need to be rewound. This is the instruction that has been executing for the longest and so is most likely to have nearly completed its instruction without errors in the prediction. In addition, the execution of that instruction is no longer conditional on previous predictions being correct. In contrast, the most recent instruction will likely only be executed (in the specified order) if the predictions for all preceding in-flight instructions are correct. Secondly, only a small number of items of data are corrupted. As previously explained and shown in FIG. 1, several subsets of data are used to form a prediction for a given instruction. By corrupting the oldest entries, it is still possible to produce predictions using the shorter subsets that do not rely on this data. The amount of corruption is therefore limited.

As more entries become corrupted, the likelihood that a rewind will rewind into the corrupted area increases and the likelihood that a good prediction can still be made will decrease. Consequently, the present technique allows for a hard stall. In particular, only a certain number of entries are permitted to be corrupted before a stall is forced. When this stall occurs, the pipeline may be allowed to restart when the hard stall point 302 is no longer passed, or it may be allowed to restart when all corruption has been removed (i.e. when there are no in-flight instructions that rely on the overwritten data).

The tables that would take, as input, the corrupted data are disabled and therefore do not produce predictions. Predictions are still produced for the remaining table. In addition, for instructions for which none of the data is corrupted, each of the tables may be available.

FIG. 4a illustrates example parameters using this technique. Here it is assumed that the number of in-flight instructions at once is 80 and that each entry in the LHR occupies four bits. In addition it is assumed that 63 entries are used for all subsets of historic data. This means that a total of (63+80)*4=572 bits are required. If there are eight different LHRs, this requires a total of 572*8=4576 bits.

As the number of in-flight branches required reduces from 80 to 60 to 50 to 40, the number of bits required reduces from 4480 to 3840 to 3520 to 3200.

FIG. 4b illustrates the number of bits used by different tables of the TAGE predictor. In this example, table 1 requires 3 entries (12 bits), table 2 requires 5 entries (20 bits), table 3 requires 10 entries (40 bits), table 4 requires 15 entries (60 bits), table 5 requires 20 entries (80 bits), table 6 requires 30 entries (120 bits), table 7 requires 40 entries (160 bits), and table 8 requires 50 entries (200 bits). From this it is possible to determine how many entries must be corrupt before a table would be disabled. In particular, this is equal to 50 minus the number of entries required.

FIG. 4b therefore illustrates the relationship between the number of predictions that can be made about an instruction in relation to the number of historic entries required to make that prediction. It will be appreciated that as the usefulness of the TAGE1 predictor declines, it is more appropriate to discourage stalls by allowing corruption and as the usefulness of the TAGE1 predictor increases, it is desirable to prevent corruption even if this causes stalls to occur. It will also be appreciated that in systems where there are multiple LHRs (each capturing a different portion of the GHR), each LHR may have a different effectiveness. It is therefore useful to be able to trade off stall avoidance against prediction efficiency for each LHR individually.

Figure 5:
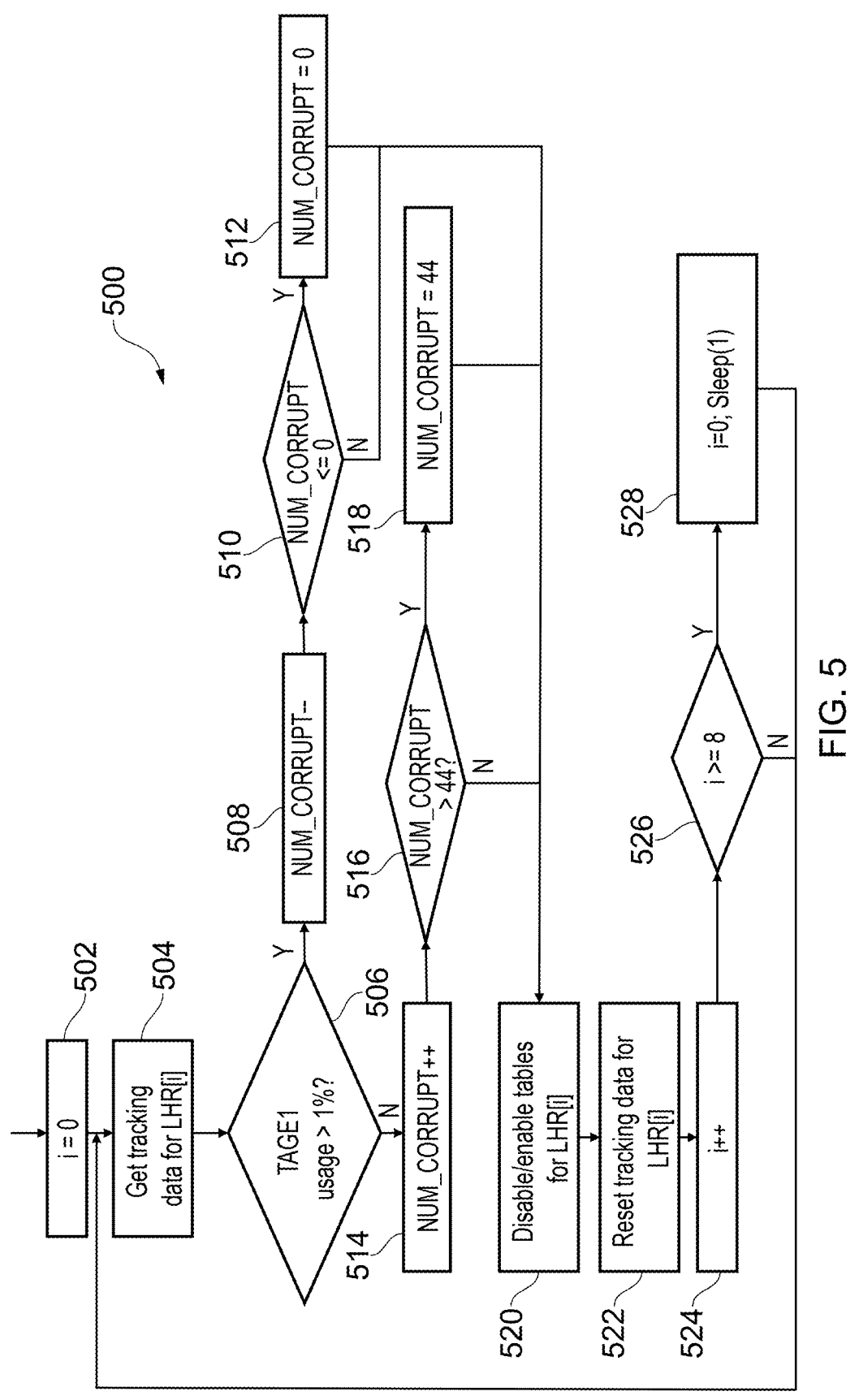
FIG. 5 shows a flowchart that shows how, at runtime, that permitted level of corruption can be changed.

FIG. 5 shows, in the form of a flowchart 500, how changing of the permitted corruption level can be achieved at runtime using the tracking circuitry 126 to track the efficacy of each LHR. The process begins at a step 502 where i, the iterator used to iterate through each LHR, is set to 0. Then at step 504, the tracking data obtained by the tracking circuitry 126 for LHR[i] is obtained. At step 506, it is determined whether the usage of TAGE1 in respect of LHR[i] is above some predetermined value. In this case, we consider a value of 1%. If this threshold is not met, i.e. if the LHR is not being relied upon to produce predictions, then at step 514, the number of permitted corrupted entries is increased by 1. Step 516 determines whether this value is greater than 44 and if so, step 518 sets this number to 44. In any event, the process proceeds to step 520. If the TAGE usage is above 1% at step 506, then at step 508 the number of permitted corrupted entries is decreased by 1. Step 510 then determines whether this value is less than or equal to 0 and if so, step 512 sets this number to 0. In any event, the process proceeds to step 520.

In other words, steps 508, 510, 512, 514, 516, and 518 clamp the number of entries that can be corrupt to between 0 and 44.

At step 520, the TAGE tables are disabled/enabled based on the corruption level so that corrupt data will not be used to make predictions for LHR[i]. Then at step 522, the tracking data for LHR[i] is reset. Step 524 increments i. Step 526 determines if all LHRs have been considered and if not, the process returns to step 504. Otherwise, at step 528, i is reset to 0 and the process sleeps (e.g. for one second) to begin the consideration process again.

In this example, every second that an LHR's usage for TAGE prediction is above 1% causes the number of corrupt entries to be reduced and every second that an LHR's usage for TAGE1 prediction is at or below 1% causes the number of corrupt entries to be increased such that the number of corrupt entries is between 0 and 44. As shown in FIG. 4b, 44 corrupt entries allow tables T1-T5 to be used. Thus, as the TAGE1 predictor is used to a large extent over time, the amount of corrupt entries permitted is decreased. The lack of use of the TAGE1 predictor (i.e. the lower reliance on the LHRs) over time permits corruption to increase.

Figure 6:
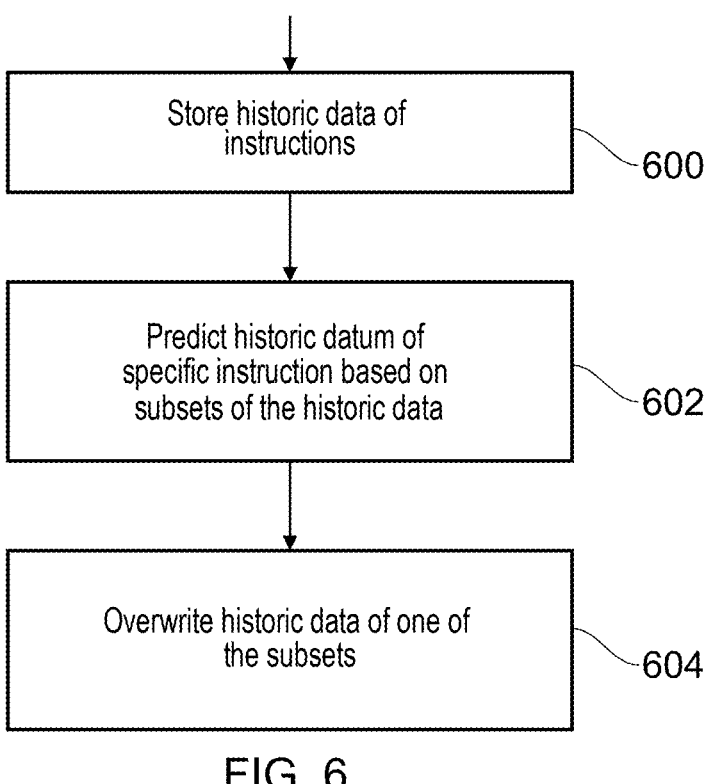
FIG. 6 shows a flowchart that shows a method of data processing in accordance with some examples.

FIG. 6 shows a method of data processing in accordance with some examples. At a step 600, historic data of instructions is stored (e.g. in an LHR 104). Then at step 602, subsets of the historic data are used to predict a new historic datum of a specific instruction. This new historic datum may then be stored into (e.g.) the LHR 104. Finally, in writing new historic data to the (e.g.) LHR, an entry will be overwritten that forms one of the subsets of data used to produce predictions in step 604.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 7:
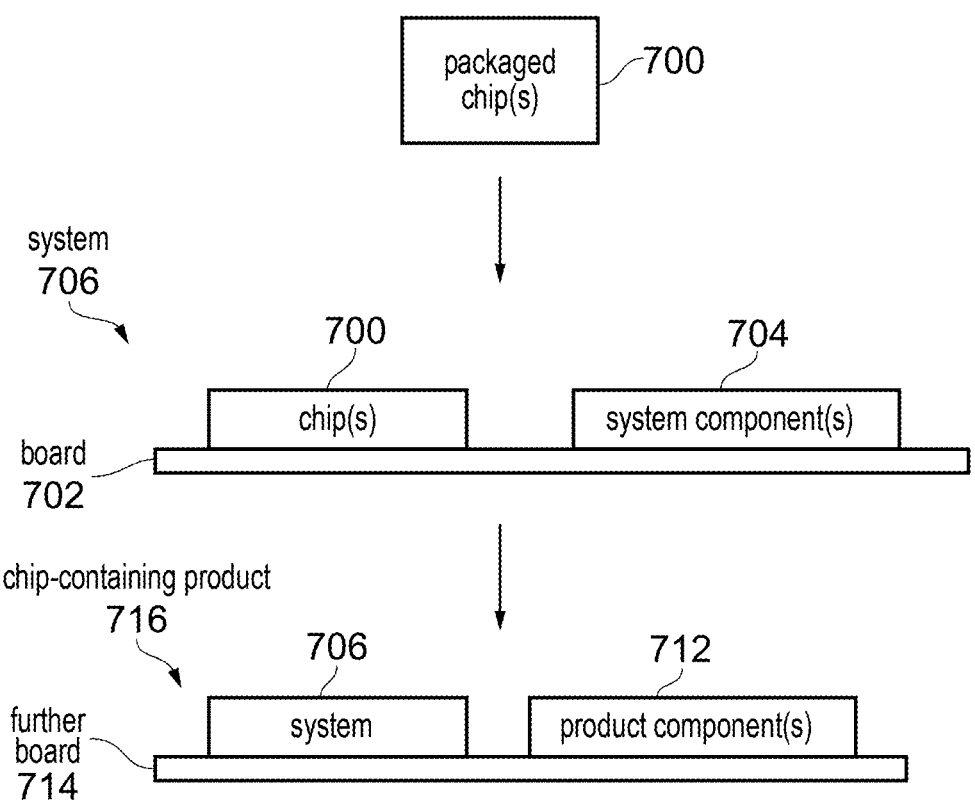
FIG. 7 shows a packaged chip example.

As shown in FIG. 7, one or more packaged chips 700, with the apparatus described above implemented on one chip or distributed over two or more of the chips, are manufactured by a semiconductor chip manufacturer. In some examples, the chip product 700 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 700 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 700 are assembled on a board 702 together with at least one system component 704 to provide a system 706. For example, the board may comprise a printed circuit board. The board substrate may be made of any of a variety of materials, e.g. plastic, glass, ceramic, or a flexible substrate material such as paper, plastic or textile material. The at least one system component 704 comprise one or more external components which are not part of the one or more packaged chip(s) 700. For example, the at least one system component 704 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 716 is manufactured comprising the system 706 (including the board 702, the one or more chips 700 and the at least one system component 704) and one or more product components 712. The product components 712 comprise one or more further components which are not part of the system 706. As a non-exhaustive list of examples, the one or more product components 712 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 706 and one or more product components 712 may be assembled on to a further board 714.

The board 702 or the further board 714 may be provided on or within a device housing or other structural support (e.g. a frame or blade) to provide a product which can be handled by a user and/or is intended for operational use by a person or company.

The system 706 or the chip-containing product 716 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, System Verilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The present technique could be configured as follows:

1. A data processing apparatus comprising:
   history storage circuitry configured to store historic data of instructions; and
   prediction circuitry configured to predict a historic datum of a specific instruction based on a plurality of subsets of the historic data of the instructions, wherein
   the history storage circuitry is configured to overwrite the historic data of one of the in flight instructions to form a corrupted instruction datum; and
   at least one of the subsets of the historic data of the instructions includes the corrupted historic datum.

2. The data processing apparatus according to clause 1, wherein
   the history storage circuitry is configured to store control flow information of control flow instructions as the historic data of the instructions;
   the specific instruction is a specific control flow instruction; and
   the one of the instructions is one of the control flow instructions.

3. The data processing apparatus according to any preceding clause, wherein
   at least one of the subsets of the historic data of the instructions lacks the corrupted historic datum.

4. The data processing apparatus according to any preceding clause, wherein
   one or more items of the historic data are predicted historic data from those of the instructions that are in-flight.

5. The data processing apparatus according to any preceding clause, wherein
   the prediction circuitry is configured to suppress or limit predictions produced using one of the subsets of the historic data of the instructions that includes the corrupted outcome.

6. The data processing apparatus according to any preceding clause, wherein the prediction circuitry is configured to use a different plurality of subsets of the historic data to produce predictions for different instructions; and
   the corrupted outcome is corrupted in respect of older instructions in the instructions and is uncorrupted in respect of new instructions in the instructions.

7. The data processing apparatus according to any preceding clause, wherein
   the corrupted historic datum is an oldest historic datum of the historic data.

8. The data processing apparatus according to any preceding clause, wherein
   the history storage circuitry is configured to overwrite a plurality of the historic data of the instructions to form a plurality of corrupted historic data including the corrupted historic datum.

9. The data processing apparatus according to clause 8, wherein
   the corrupted historic data are oldest historic data of the historic data.

10. The data processing apparatus according to any one of clauses 8-9 further comprising:
   limitation circuitry configured to cause execution of further instructions to stall in response to a number of the corrupted historic data meeting a predetermined limit.

11. The data processing apparatus according to clause 10, wherein the predetermined limit is changeable at runtime.

12. The data processing apparatus according to clause 11, comprising:
   further prediction circuitry different from the prediction circuitry and configured to predict the historic datum of the specific instruction in a manner different to the prediction circuitry;
   arbitration circuitry configured to arbitrate between the prediction circuitry and the further prediction circuitry to produce a final prediction; and
   tracking circuitry configured to track a number of times that the final prediction is generated from the prediction circuitry, wherein
   the predetermined limit is based on the number of times that the final prediction is generated from the prediction circuitry.

13. The data processing apparatus according to clause 12, wherein
   as the number of times that the final prediction is generated from the prediction circuitry increases, the predetermined limit decreases.

14. The data processing apparatus according to any one of clauses 10-13, comprising:
   a plurality of history storage circuits, including the history storage circuitry, wherein
   each of the history storage circuits is configured to store historic data of different subsets of the instructions; and
   each of the history storage circuits has its own predetermined limit.

15. The data processing apparatus according to any preceding clause, wherein
   the subsets are of different sizes; and
   the subsets used to predict the historic datum of the specific instruction comprise a contiguous series of the historic data starting from a most recent of the historic data in program order.

16. The data processing apparatus according to any preceding clause, wherein
   the prediction circuitry comprises a TAGE predictor that stores a plurality of tables; and each of the subsets of the historic data of the instructions is used to index into a different table of the TAGE predictor;

at least one table is disabled in response to the corrupted historic datum being formed.

17. The data processing apparatus according to clause 16, comprising:

a corruption counter to count a number of the historic data that are corrupted; and the at least one table is enabled and disabled based on a value of the corruption counter.

18. The data processing apparatus according to any preceding clause, wherein the history storage circuitry is implemented as a circular buffer.

19. A data processing method comprising:

storing historic data of instructions; and predicting a historic datum of a specific instruction based on a plurality of subsets of the historic data of the instructions, wherein the historic data of one of the instructions is overwritten to form a corrupted instruction datum; and at least one of the subsets of the historic data of the instructions includes the corrupted historic datum.

20. A non-transitory computer-readable medium to store computer-readable code for fabrication of a data processing apparatus comprising:

history storage circuitry configured to store historic data of instructions; and prediction circuitry configured to predict a historic datum of a specific instruction based on a plurality of subsets of the historic data of the instructions, wherein the history storage circuitry is configured to overwrite the historic data of one of the instructions to form a corrupted instruction datum; and at least one of the subsets of the historic data of the instructions includes the corrupted historic datum.

We claim:

1. A data processing apparatus comprising:

history storage circuitry configured to store historic data of instructions;

wherein the historic data of the instructions comprises:

margin entries associated with those of the instructions that are older than an oldest in-flight instruction, the margin entries being tracked to enable a rewind if the oldest in-flight instruction is mispredicted, and in-flight entries relating to those of the instructions that are in-flight;

and prediction circuitry configured to predict a historic datum of a specific instruction based on a plurality of subsets of the historic data of the instructions, and responsive to a misprediction of at least one of the instructions to rewind the history storage circuitry; wherein the history storage circuitry is configured to form a corrupted entry of the historic data by overwriting at least one of the margin entries which would be used for rewinding the history storage circuitry in the event of a misprediction of the oldest in-flight instruction by the prediction circuitry based on the historic data tracked in the history storage circuitry; and at least one of the subsets of the historic data of the instructions includes the corrupted entry of the historic data.

2. The data processing apparatus according to claim 1, wherein the history storage circuitry is configured to store control flow information of control flow instructions as the historic data of the instructions;

the specific instruction is a specific control flow instruction; and the one of the instructions is one of the control flow instructions.

3. The data processing apparatus according to claim 1, wherein at least one of the subsets of the historic data of the instructions lacks the corrupted entry of the historic data.

4. The data processing apparatus according to claim 1, wherein the prediction circuitry is configured to suppress or limit predictions produced using one of the subsets of the historic data of the instructions that includes the corrupted entry of the historic data.

5. The data processing apparatus according to claim 1, wherein the corrupted entry of the historic data is an oldest historic datum of the historic data.

6. The data processing apparatus according to claim 1, wherein the history storage circuitry is configured to overwrite a plurality of the historic data of the instructions to form a plurality of corrupted entries of the historic data including the corrupted entry of the historic data.

7. The data processing apparatus according to claim 6, wherein the corrupted entries of the historic data are oldest historic data of the historic data.

8. The data processing apparatus according to claim 6 further comprising:

limitation circuitry configured to cause execution of further instructions to stall in response to a number of the corrupted entries of the historic data meeting a predetermined limit.

9. The data processing apparatus according to claim 8, wherein the predetermined limit is changeable at runtime.

10. The data processing apparatus according to claim 9, further comprising:

further prediction circuitry different from the prediction circuitry and configured to predict the historic datum of the specific instruction in a manner different to the prediction circuitry;

arbitration circuitry configured to arbitrate between the prediction circuitry and the further prediction circuitry to produce a final prediction; and tracking circuitry configured to track a number of times that the final prediction is generated from the prediction circuitry, wherein the predetermined limit is based on the number of times that the final prediction is generated from the prediction circuitry.

11. The data processing apparatus according to claim 10, wherein as the number of times that the final prediction is generated from the prediction circuitry increases, the predetermined limit decreases.

12. The data processing apparatus according to claim 8, further comprising:

a plurality of history storage circuits, including the history storage circuitry, wherein each of the history storage circuits is configured to store historic data of different subsets of the instructions; and each of the history storage circuits has its own predetermined limit.

13. The data processing apparatus according to claim 1, wherein the subsets are of different sizes; and the subsets used to predict the historic datum of the specific instruction comprise a contiguous series of the historic data starting from a most recent of the historic data in program order.

14. The data processing apparatus according to claim 1, wherein the prediction circuitry comprises a TAgged GEometric length (TAGE) predictor that stores a plurality of tables;

each of the subsets of the historic data of the instructions is used to index into a different table of the TAGE predictor; and at least one table is disabled in response to the corrupted entry of the historic data being formed.

15. The data processing apparatus according to claim 14, further comprising:

a corruption counter to count a number of entries of the historic data that are corrupted; wherein the at least one table is enabled and disabled based on a value of the corruption counter.

16. The data processing apparatus according to claim 1, wherein the history storage circuitry is implemented as a circular buffer.

17. A data processing method comprising:

storing historic data of instructions;

wherein the historic data of the instructions comprises:

margin entries associated with those of the instructions that are older than an oldest in-flight instruction, the margin entries being tracked to enable a rewind upon a misprediction of the oldest in-flight instruction, and in-flight entries relating to those of the instructions that are in-flight;

and predicting a historic datum of a specific instruction based on a plurality of subsets of the historic data of the instructions, wherein at least one of the margin entries, which would be used for rewinding in the event of a misprediction of the oldest in-flight instruction based on the historic data, is overwritten to form a corrupted entry of the historic data; and at least one of the subsets of the historic data of the instructions includes the corrupted entry of the historic data.

18. A non-transitory computer-readable medium to store computer-readable code for fabrication of a data processing apparatus comprising:

history storage circuitry configured to store historic data of instructions;

wherein the historic data of the instructions comprises:

margin entries associated with those of the instructions that are older than an oldest in-flight instruction, the margin entries being tracked to enable a rewind upon a misprediction of the oldest in-flight instruction, and in-flight entries relating to those of the instructions that are in-flight;

and prediction circuitry configured to predict a historic datum of a specific instruction based on a plurality of subsets of the historic data of the instructions, and responsive to a misprediction of at least one of the instructions to rewind the history storage circuitry; wherein the history storage circuitry is configured to form a corrupted entry of the historic data by overwriting at least one of the margin entries which would be used for rewinding the history storage circuitry in the event of a misprediction of the oldest in-flight instruction by the prediction circuitry based on the historic data tracked in the history storage circuitry; and at least one of the subsets of the historic data of the instructions includes the corrupted entry of the historic data.

* * * * *